United States Patent [19]

Stein

[11] Patent Number: 4,647,775

[45] Date of Patent: Mar. 3, 1987

[54] PYROMETER 1

[75] Inventor: Alexander Stein, Secaucus, N.J.

[73] Assignee: Quantum Logic Corporation, Oakland, N.J.

[21] Appl. No.: 707,741

[22] Filed: Mar. 4, 1985

[51] Int. Cl.$^4$ .................................................. G01J 1/00
[52] U.S. Cl. ..................................... 250/338; 250/341
[58] Field of Search .................. 250/330, 338 R, 341; 356/3, 6; 374/1, 2, 6, 128, 130, 168

[56] References Cited

U.S. PATENT DOCUMENTS

| | | | |
|---|---|---|---|
| 2,989,889 | 6/1961 | Strang | 356/6 |
| 3,194,108 | 7/1965 | Güther | 356/6 |
| 4,081,678 | 3/1978 | Macall | 374/128 |
| 4,139,769 | 2/1979 | McCrum et al. | 250/341 |
| 4,151,415 | 4/1979 | Lipke | 250/341 |
| 4,315,150 | 2/1982 | Darringer et al. | 250/338 |

*Primary Examiner*—Janice A. Howell

[57] ABSTRACT

A pyrometer adapted to be disposed remotely from a heated target employs a manually operated optical range finding device for measuring the distance between the target and the pyrometer. The device includes an objective lens mounted in a rotation-type focusing mechanism, split image effect prisms and a viewing screen. A split image appears on the screen when viewing until the mechanism is rotated to a unique angular position at which the image split disappears, the unique focusing position being a monotonic function of the distance. A mechanical gearing arrangement responsive to mechanism rotation is connected to a multi-turn potentiometer having oppositely disposed fixed contacts at each end and a movable contact. The movable contact is moved along the potentiometer in accordance with rotation of the mechanism. For each unique focusing position of the lens there is a corresponding unique position of the movable contact with respect to the end contacts.

9 Claims, 6 Drawing Figures

PYROMETER 1

CROSS REFERENCE TO CO-PENDING APPLICATIONS

The present application is related to another application Ser. No. 707,742 filed of even date herewith. Both applications are owned by a common assignee.

BACKGROUND OF THE INVENTION

In accordance with the principles of the present invention, radiation pyrometry techniques are utilized in order to obtain accurate remote measurements of the surface temperature of hot opaque targets which diffusely reflect incident radiation, as for example, measurement of surface temperatures of metal sheets and billets in a rolling mill.

The significance of accurate temperature measurements of this type can be readily understood in view of the improvement in product uniformity obtainable. Steel billets are heated before entering the mill line. These billets must be heated to a well determined temperature in order to maintain uniformity of product. If the billet temperature varies from the desired value, the heating process can be adjusted accordingly. Conventional remote temperature measuring devices are known to be inaccurate because of uncertainty about the emissivity of the targets.

The present invention enables operators to determine the billet temperature accurately which makes it possible to regulate the billet heating with equal accuracy and thereby improve product uniformity.

SUMMARY OF THE INVENTION

All physcial bodies at temperatures above absolute zero emit electromagnet radiation over a wide range of wavelengths in accordance with the Planck formula $$L = (\epsilon)2c^2h\lambda^{-5}\left(\exp\left(\frac{hc}{2KT}\right)^{-1}\right)^{-1}$$

where L is the spectral radiance at a selected wavelength $\lambda$, T is the temperature of the body, $\epsilon$ is the emissivity at wavelength $\lambda$, c is the velocity of light in vacuum, h is Plancks constant and k is Boltzmann's constant.

In other words, for any body such as the targets of interest, there is a complex but fixed relationship of the three parameters, spectral radiance, emissivity and temperature at a specified wave length. The emissivity parameter frequently is either completely unknown or inaccurately known whereby calculations of temperature using Planck's formula cannot be made with high accuracy.

When a target is subjected to incident radiation of specified wavelength and a portion of this radiation is reflected, the relationship between the target emissivity at this wavelength and the relative reflected radiation r is defined in Kirchhoff's formula as $\epsilon = 1 - r$.

In accordance with the principles of the present invention, the known Kirchhoff relationship is utilized in providing separate direct measurement of target emissivity. The target radiance is determined in a separate measurement. The Planck formula is employed in using these measurements to compute the target temperature which is then displayed in analog or digital form.

More particularly, the instrument which is portable and hand held is positioned at a location remote from the target. A laser beam of specified wavelength generated in the instrument is directed upon the target. The target as previously indicated is diffusely reflecting whereby reflected radiation caused by the beam impingement is scattered throughout hemispherical space.

A portion of the reflected radiation caused by the beam impingement is received at the instrument. This portion or fraction as is known is inversely proportional to the square of the distance between the target and the remote location. Moreover this portion is directly proportional to the amount of laser radiation which strikes the target. This amount of laser radiation is determined by the power level of the generated beam.

The target itself generates its own spectral radiance which has a component at the same wavelength as the laser beam.

A portion of the target radiance received at the instrument is measured separately from the portion of the reflected radiation caused by beam impingement and a first electrical signal monotonically related to the received portion of the target radiance is produced. A second electrical signal monotonically related to the portion of reflected radiation as adjusted in view of the inverse square law for the distance between target and instrument is also produced. Since the power level of the laser beam can vary as will be explained below, a third electrical signal monotonically related to the power level of the beam is also produced.

The relative reflected radiation, r in Kirchhoff's formula, is then defined electrically as the ratio of the second signal to the third signal whereby a microprocessor responding appropriately to the second and third signals in accordance with Kirchhoff's formula computes the emissivity value. This microprocessor, then utilizing the computed value of emissivity and the first signal in accordance with Planck's formula, computes the temperature.

Once the instrument is properly calibrated, the temperature value so computed will be found to correspond extremely closely to the actual temperature.

The second signal as indicated previously is dependent upon the portion of the reflected radiation received at the instrument as adjusted because of the inverse square law. To this end, the portion is measured electrically while the distance between target and instrument is measured optically. The optical measurement is used to modify the electrical measurement in order to produce the second signal.

The instrument thus utilizes a combination of electrical and optical systems.

The present invention is primarily directed toward the construction of the instrument and the optical systems used therein. The aforementioned co-pending applications is directed primarily toward the electrical systems used therein.

DETAILED DESCRIPTION OF PREFERRED EMBODIMENTS

Figure 1:
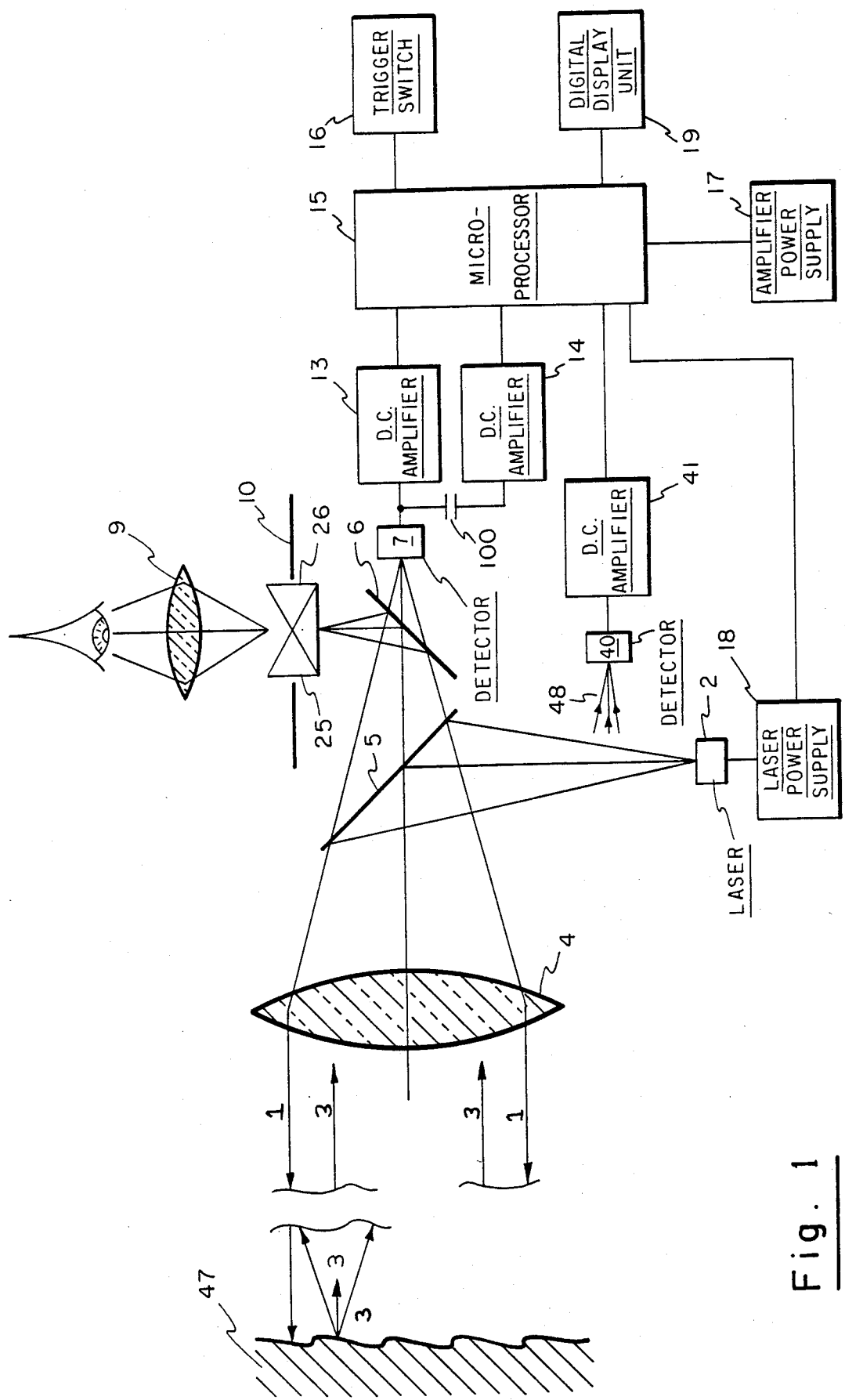
FIG. 1 is a simplified diagramatic view illustrating the optical and electrical systems employed in the invention.
Figure 2:
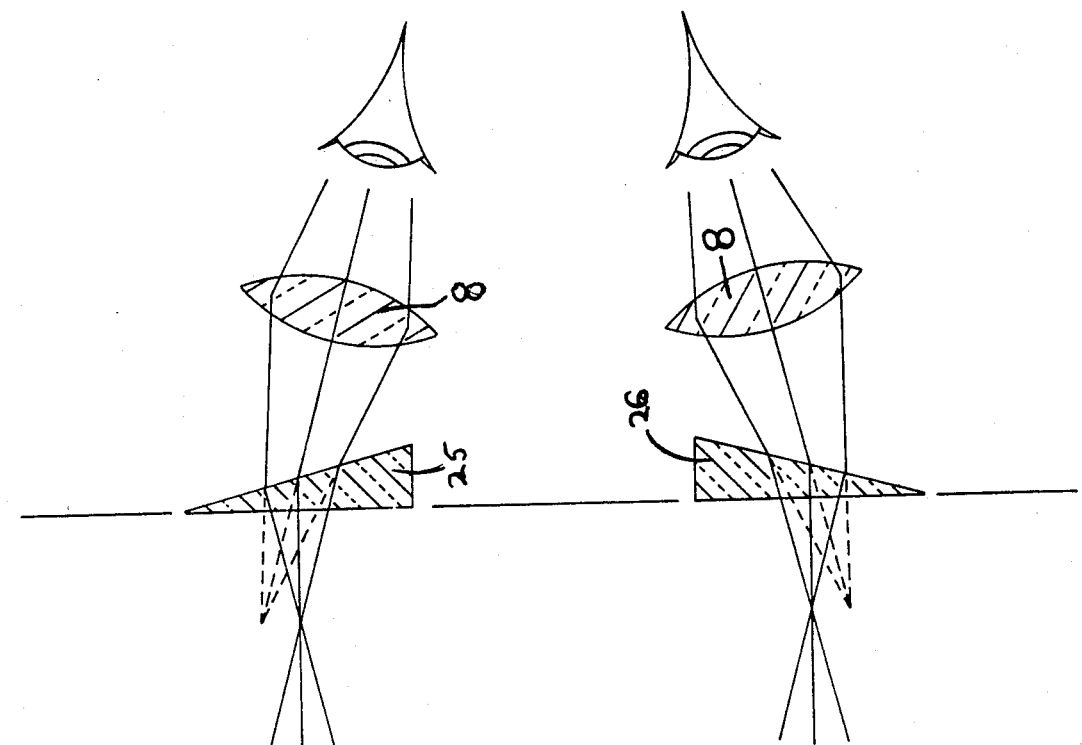
FIGS. 2 and 2A are simplified diagramic views of portions of the optical system employed in the invention.
Figure 2A:
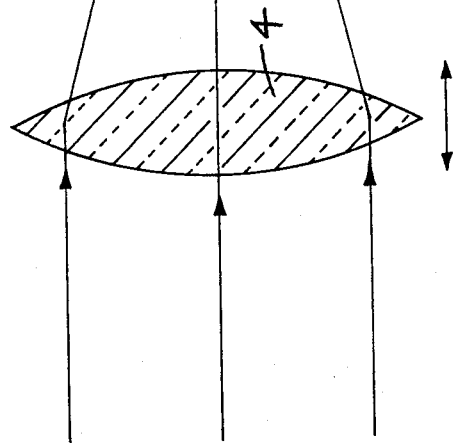
Figure 2A:
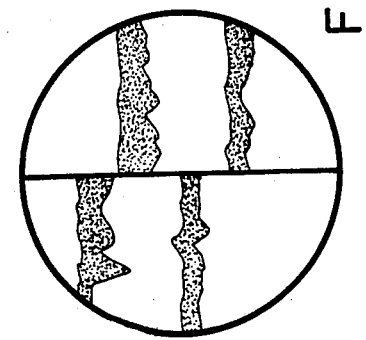
Figure 3:
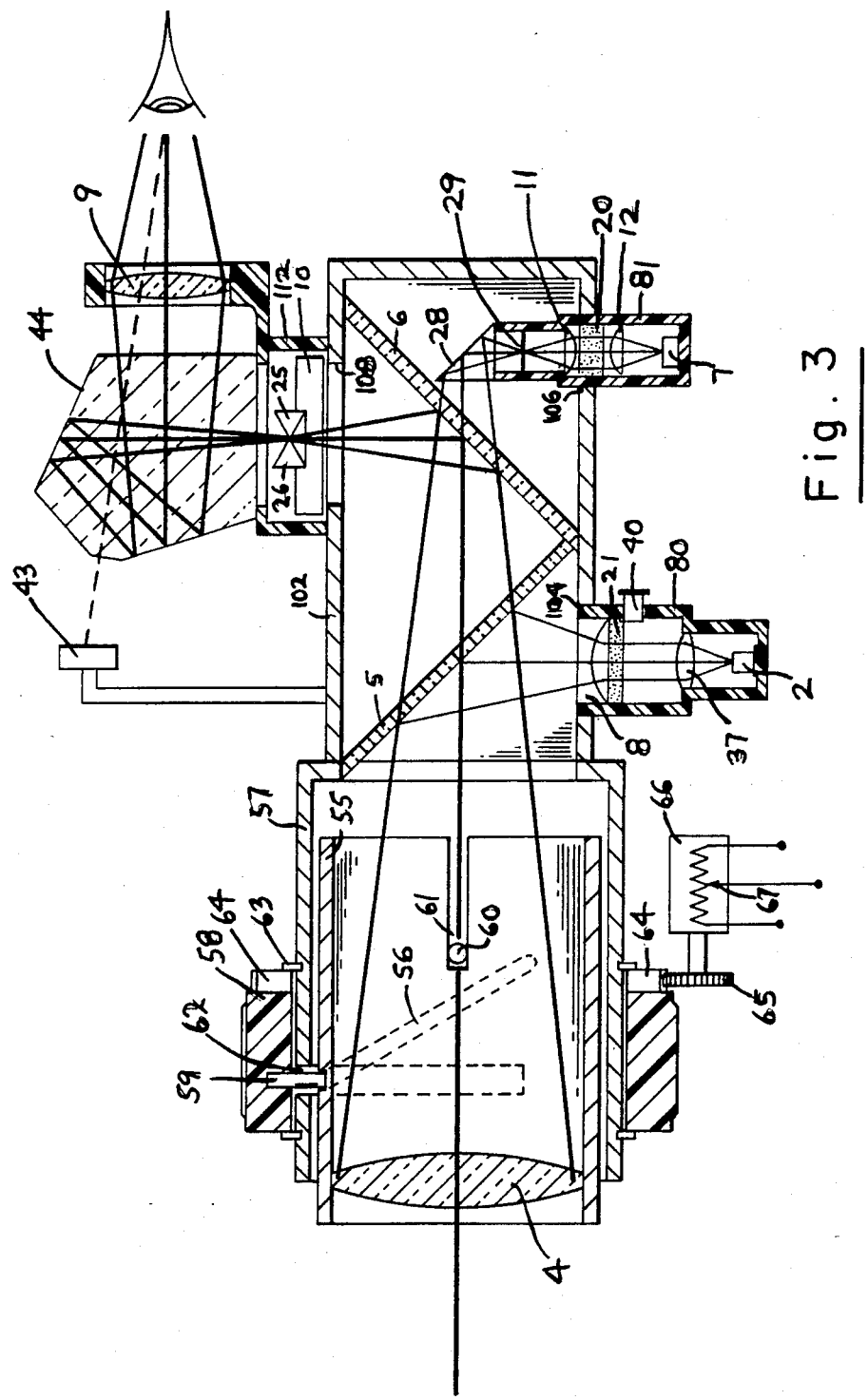
FIG. 3 is a side view in cross section of the housing and certain component parts employed in the invention.
Figure 4:
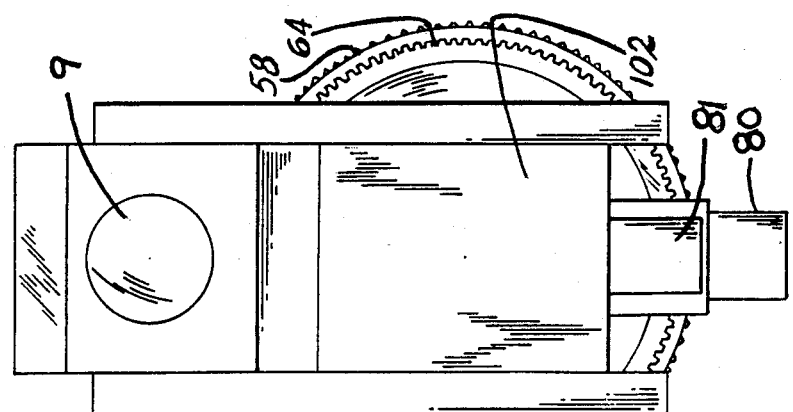
FIG. 4 is a rear view of the structure shown in FIG. 3.
Figure 5:
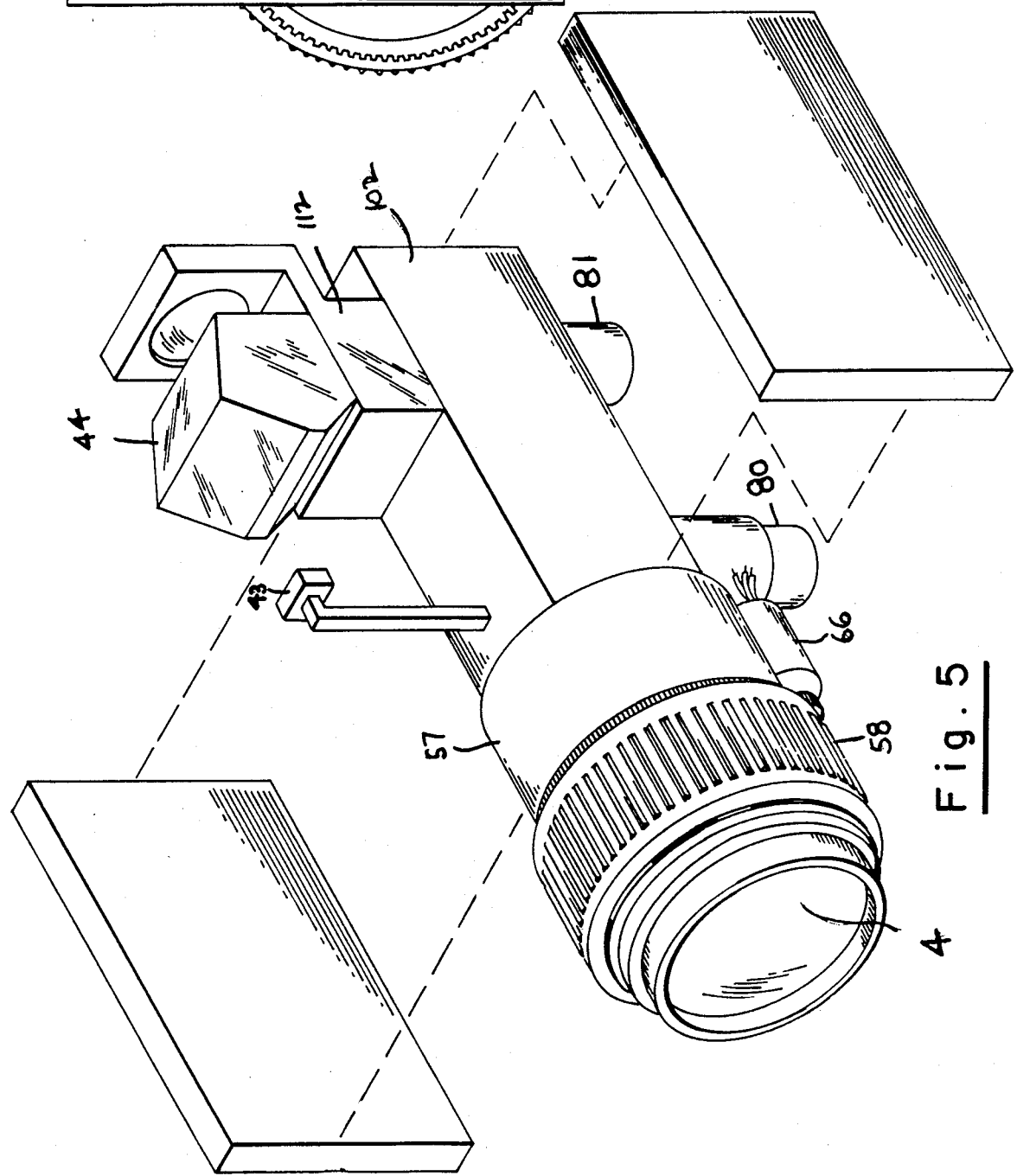
FIG. 5 is a perspective view of the structure shown in FIGS. 3.

Referring now to FIGS. 1-5, a first front relatively short hollow circular cylinder 57 having a first diameter is axially aligned with and connected end to end with a second rear longer hollow cylinder 102 having a rectangular shape in cross section. These cylinders constitute the major instrument housing.

The second cylinder 102 has a small forwardly disposed circular aperture 104 in one wall and another small rearwardly disposed circular aperture 106 in the same wall. The centers of these apertures 104 and 106 lie along a common line parallel to the longitudinal axis of the cylinder 102.

Cylinder 102 also has a large rectangular aperture 108 disposed in a wall opposite to that.

Lens barrel 80 connected to aperture 104 has an axis perpendicular to the axis of cylinder 102 with a gallium arsenide diode laser 2 disposed therein. Also disposed in the barrel 80 are collimating lens 37, beam diverging lense 8 and filter 21. Detector 40 is disposed in the side of barrel 80. Filter 21 passes the laser radiation but rejects incoming infrared radiation but for a narrow spectral component centered around the laser wavelength. This protects the laser from excessive heating by incident infrared radiation. Photodetector (diode) 40 picks up stray laser radiation and provides a measure of the outgoing laser intensity as a normalization for the reflectivity measurement.

Lens barrel 81 connected to aperture 106 also has an axis perpendicular to the axis of cylinder 102 with photodetector 7 disposed therein. Prism 28 is used to fold the optical path to reduce the overall length of the instrument. Pin hole aperture 29 is located at the focal plane of lens 4 which is disposed in the front end of the front cylinder. This pin hole as will be explained in more detail hereinafter passes radiation from a geometrically corresponding area in the target plane. Lens 11 and 12 separated by filter 20 permit only a selected spectral portion (centered around the laser wavelength) to pass onto detector 7, the major spectral portion being reflected or absorbed by the filter. This construction suppresses stray radiation whereby most of the stray radiation passing through the pin hole will not reach the detector 7. The inner walls of both cylinders are rendered black to further suppress stray radiation. The LED digital display 43 is projected into the viewers field of observation through the image erecting prism.

Dichroic beam splitters 5 and 6 are disposed essentially at right angles to each other in cylinder 102 and at 45° and 135° respectively with respect to the longitudinal axis of cylinder 102.

A fixture 112 is secured to cylinder 102 overlying aperture 108 and has a viewing screen 10 parallel to the aperture with small prisms 25 and 26 disposed in the center. The fixture has a right angled section accommodating eye piece 9 and offset from the rest of the fixture upon which prism 44 rests.

Lens 4 is firmly mounted in lens barrel 55 which has a helical groove 56 on its outside surface. Barrel 55 is disposed with its axis aligned with the axis of cylinder 57. Cylinder 57 has a pin 60 which engages a slot 61 in the barrel 55. A rotatable element, focusing ring 58 is held in place on the outside of cylinder 57 by retaining rings 63 and has a pin 59 which reaches through slot 62 in cylinder 57 into the groove 56. Manual rotation of ring 58 causes the barrel 55 to move forward or backward along the common axis (with cylinder 57) with respect to cylinder 57 which stays fixed.

As the ring is rotated, the prisms 25 and 26 deflect adjacent image sections of the target in opposite directions thereby generating a split image when the target is out of focus. The split image disappears when the target is in focus. These prisms are used in conventional range finding manner.

Gear 64 is attached to ring 58 and transmits the rotation to a smaller gear 65 which drives a ten turn potentiometer 66. A known voltage is applied across the potentiometer and the fraction of this voltage which appears between the moving contact 67 of the potentiometer and the terminal of lower potential of the potentiometer is linearly related to the angular position of the ring 58.

Thus the angular position of ring 58 at the point at which the target is brought into focus provides an optical measurement of the distance between the target and the instrument as in a conventional camera range finder, and the gearing connections between the ring 58 and the potentiometer enables the generation of an electrical (direct voltage) signal which is an electrical equivalent of this distance.

The use of the beam splitters 5 and 6 superimposes the optical axes of the laser transmitter system, the photodetector receiver system and the viewing system with lens 4 serving as the objective lens for all three systems.

Operation of the instrument is as follows. The radiation emitted by the laser diode 2 passes through lens 37, filter 21, lens 8, deflects off beam splitter 5 and passes through lens 4 to strike target 47, the path of the outgoing radiation being shown at 1. A fraction of the reflected radiation as shown at 3 together with a portion of the thermal radiation from the target is collected by lens 4, both passing through beam splitters 5 and 6, prism 28, pinhole 29, lens 11, filter 20 and lens 12 to strike photodiode 7.

Simultaneously, the visible image of the target 47 passes through lens 4, splitter 5 to splitter 6 which then deflects the image onto the viewing screen 10 where it can be viewed through the eye piece.

Splitter 5 reflects the laser radiation and passes the reflected radiation and visible light. Splitter 5 is a transparent rectangular glass plate having a central strip coated with material for reflecting the laser beam. The strip and beam geometry are chosen so that the beam does not strike uncoated regions of the glassplate. Those portions of the reflected radiation caused by beam impingement on the target and the thermal radiation emitted by the hot target pass through these uncoated regions. The visible light from the target passes through the full area of splitter 5.

Splitter 6 is of known type which reflects visible light and passes the reflected laser radiation and the thermal radiation emitted by the hot target, both types of radiation being infrared.

In order to measure the emissivity of the target, the operator first focuses the objective lens on the target by rotating the focusing ring until the split image disappears. This action properly positions the movable contact on the potentiometer. Trigger switch 16 is then depressed. The unit is battery powered. This action energizes the microprocessor 15, the laser power supply 18, the amplifier power supply 17, and the direct current amplifiers 13, 14, and 41.

Initially, before the laser itself is actuated, the target spectral radiance or radiation passes through the lens 4, and the beam splitters 5 and 6 onto the photodiode 7. This produces a signal monotonically dependent upon the strength of this radiation which is amplified in amplifier 13 and then is stored in the microprocessor 15. Amplifier 14 is a synchronous amplifier which is actuated only when the reflected radiation from laser beam impingement strikes the photodiode. The laser is actuated and produces an initial string of pulses. The laser actuation and theactuation of the amplifier 14 are controlled by the microprocessor.

The target radiation is essentially constant and represents an essentially constant direct current component in the output of the photodiode. The reflected radiation caused by laser beam impingement is pulsating. A capacitor is interposed between the photodiode and amplifier 14 to block the constant component. The pulsating component is passed to amplifier 14 which due to the microprocessor control only conducts when this component is present.

A signal monotonically dependent upon the reflected radiation is thus produced and sent to the microprocessor.

A fixed voltage is applied across potentiometer 66. The fraction of that voltage appearing between the moving contact and ground is monotonically related to the target distance by the Gaussian lens formula and thus represents the correction needed because of the inverse square law previously referred to. This fractional voltage is also supplied to the microprocessor.

The Gaussian lens formula $D = f^2/x$ relates the target distance D to the image distance x from the focal plane. f is the focal length of lens 4. The value of x is linearly related to the third signal $V_3$, $x = a V_3 + b$, where a and b are constants dependent upon the starting position of the lens, the pitch of the helical groove 56 and the gear ratio of gears 64, 65.

Photodiode or detector 40 responds to the stray radiation produced by the laser 7. Since the laser power can vary because of the variations in ambient temperature, changes in battery voltage and the like, the output of diode 40 will vary monotonically with the variations in output power. The output of diode 40 passes through amplifier 41 to the microprocessor whereby the ratio of the signal representing the portion of the reflected radiation adjusted in accordance with the inverse square law to that of the signal representing the laser output power can be calculated and the Kirchhoff equation solved to calculate the emissivity. The target spectral radiance value has already been stored in the microprocessor whereby the microprocessor then solves the Planck formula to calculate the temperature. The microprocessor then actuates a digital display unit 19 to cause the temperature reading to be displayed.

The instrument before being used in this fashion must first be calibrated by using a target of known emissivity at a known temperature at a measured distance from the instrument.

What is claimed is:

1. An instrument adapted to be disposed remotely from a target and comprising:

manually operated optical range finding means for measuring the distance between target and instrument, said finding means including an objective lens mounted in a rotation-type focusing mechanism, split image effect prisms and a viewing screen whereby a split image appears on the screen plane when viewing until the mechanism is rotated to a unique angular position at which the image split disappears, said unique position being a monotonic function of said distance;

a multi-turn potentiometer having first and second fixed contacts at opposite ends thereof and movable contact therebetween; and mechanical gearing means responsive to mechanism rotation and connected to said potentiometer to move said movable contact along said potentiometer in accordance with mechanism rotation to establish for each unique focusing position of said lens a corresponding unique position of the movable contact with respect to said first and second fixed contacts.

2. The instrument as set forth in claim 1 wherein as said mechanism is rotated, the lens is moved back and forth along a first optical axis extending longitudinally at right angles to the center of said lens.

3. The instrument as set forth in claim 2 wherein said screen has a second optical axis disposed at right angles to said first axis, said instrument further comprising a first beam splitter for reflecting visible light and for passing infrared, said first splitter being disposed inwardly from said lens at the intersection of the first and second axes to reflect visible light passing inwardly through said lens and along said first axis onto said screen.

4. The instrument as set forth in claim 3 further including a second beam splitter disposed between said lens and said first splitter and aligned with said first axis, said second splitter passing a major portion of infrared and visible light which passes inwardly through said lens along the first axis and reflecting along said axis toward said lens and outwardly therefrom a major portion of any infrared radiation directed onto a central portion of said second splitter along a third optic axis disposed at right angles to said first axis and parallel to said second axis.

5. The instrument as set forth in claim 4 further comprising a photodetector responsive to infrared and disposed adjacent the first splitter to receive the infrared passing therethrough.

6. The instrument as set forth in claim 5 further comprising a laser adapted to produce an infrared beam disposed along said third axis adjacent said second splitter.

7. The instrument as set forth in claim 6 wherein said photodetector is disposed along a fourth optical axis parallel to said second and third axes and perpendicular to said first axis.

8. The instrument as set forth in claim 7 further comprising a prism disposed between said first splitter and said photodetector to direct the infrared passing through the first splitter along said fourth axis onto said photodetector.

9. The instrument of claim 1 wherein said laser is disposed in an enclosure and wherein a second photodetector is mounted in the enclosure and responds to stray infrared therein.

* * * * *